(12) United States Patent
Kenington et al.

(10) Patent No.: US 8,805,321 B2
(45) Date of Patent: *Aug. 12, 2014

(54) GEOLOCATION DATA ACQUISITION SYSTEM

(75) Inventors: Peter Kenington, Devauden (GB); Nicholas James Randell, Alton (GB); Michael Joseph Flanagan, Chester, NJ (US)

(73) Assignee: JDSU UK Limited, Basingstoke, Hampshire (GB)

( * ) Notice: Subject to any disclaimer, the term of this patent is extended or adjusted under 35 U.S.C. 154(b) by 136 days.

This patent is subject to a terminal disclaimer.

(21) Appl. No.: 13/293,558

(22) Filed: Nov. 10, 2011

(65) Prior Publication Data

US 2013/0122855 A1 May 16, 2013

(51) Int. Cl.
*H04M 11/00* (2006.01)
*H04M 1/66* (2006.01)
*H04M 1/00* (2006.01)
*H04W 4/00* (2009.01)

(52) U.S. Cl.
USPC ..... 455/405; 455/410; 455/414.1; 455/435.1; 455/556.1

(58) Field of Classification Search
USPC ............. 455/226.1, 414.1, 410, 456.1, 456.5, 455/405, 422.1, 423, 466, 435.1, 556.1, 561
See application file for complete search history.

(56) References Cited

U.S. PATENT DOCUMENTS

2005/0281270 A1* 12/2005 Kossi et al. ................ 370/395.5
2006/0068712 A1 3/2006 Kroboth et al.
2009/0075648 A1 3/2009 Reed et al.
2009/0075655 A1 3/2009 Dobson et al.

(Continued)

FOREIGN PATENT DOCUMENTS

| GB | 2426155 | * 11/2006 | ............... H04M 3/22 |
| GB | 2426155 A | 11/2006 | |
| GB | 2452796 A | 3/2009 | |
| JP | 2005094634 A | 4/2005 | |
| WO | 2005029892 | 3/2005 | |

(Continued)

OTHER PUBLICATIONS

Great Britain Search Report, Application No. GB1119397.6, filed Mar. 12, 2012. (9 pages).

*Primary Examiner* — Inder Mehra
(74) *Attorney, Agent, or Firm* — George Y. Wang

(57) ABSTRACT

A geolocation data acquisition system (200) and method (400) for acquiring communication session data from a mobile radio communications network (210). A data extraction module (222, 226) extracts call session data continuously from a network of call processors (224, 228), each call processor supporting mobile communication units in an associated geographical region of the coverage area of the mobile radio communications network. The data extraction module (222, 226) provides the extracted data to one of several storage areas (260). In each storage area, a record is created of the communication session data for each call made within the coverage area of an associated set of call processors (224, 228). The records stored in each storage area (260) comprise the data available for all communication sessions in the geographical region associated with the corresponding set of call processors (224, 228).

18 Claims, 5 Drawing Sheets

(56) References Cited

U.S. PATENT DOCUMENTS

| | | | |
|---|---|---|---|
| 2012/0021772 A1* | 1/2012 | Drennan | 455/456.3 |
| 2012/0142347 A1* | 6/2012 | Morad et al. | 455/435.1 |
| 2012/0188882 A1* | 7/2012 | Wilkinson et al. | 370/252 |
| 2013/0007788 A1* | 1/2013 | Levinson et al. | 725/13 |
| 2013/0104241 A1* | 4/2013 | Blom et al. | 726/26 |
| 2013/0122925 A1* | 5/2013 | Flanagan et al. | 455/456.1 |
| 2013/0122926 A1* | 5/2013 | Kenington et al. | 455/456.1 |
| 2013/0122940 A1* | 5/2013 | Kenington et al. | 455/456.5 |

FOREIGN PATENT DOCUMENTS

| | | |
|---|---|---|
| WO | 2009034367 A1 | 3/2009 |
| WO | 2009034391 A1 | 3/2009 |
| WO | 2011068583 | 6/2011 |

* cited by examiner

GEOLOCATION DATA ACQUISITION SYSTEM

FIELD OF THE INVENTION

The field of the invention relates to a geolocation data acquisition system. The system may be used to acquire data relating to communications made in a wireless mobile communication system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. Calls may be data, video, or voice calls, or a combination of these. Such macro cells utilise high power base stations to communicate with wireless communication units within a relatively large geographical coverage area. The coverage area may be several square kilometers, or larger if it is not in a built-up area.

Typically, mobile communication units, or User Equipment as they are often referred to in 3G, communicate with a Core Network of the 3G wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennae, each of which serves one sector of the cell.

A parameter of interest to operators of mobile communication networks is 'quality of service information'. This is information that reveals how well the network is supporting users of the network. A high quality of service may be indicated by a very low rate of 'dropped' calls, or by very few mobiles experiencing low or highly variable signal strength.

In most known cellular networks, quality of service information is reported on a 'per-cell' or 'per-sector basis'. This means that the network statistics obtained will only provide an indication of, for example, the average data rate or the average number of dropped calls in a given sector. These averages do not allow the network operator to narrow down the information, for example, to indicate if a particular portion of that sector is:
(i) Habitually causing calls to be dropped; or
(ii) Suffering from a poor data rate. A poor data rate may arise as a consequence of poor coverage in that particular area, or due to interference from a neighbouring cell.

A more detailed view of these issues is very useful to network operators. One prior art approach is thus to conduct 'drive tests', to assess coverage within a sector or cell. However, drive testing is expensive, and only provides data on what is happening at street level along the particular path taken during the test. The majority of phone and data calls are now made within buildings, and drive tests do not give any indication of the quality of service experience within a building. This is a major issue.

Geo-location is the identification of the real-world geographical location of, say, a mobile communication unit of a 3G system or the like. Geo-location of mobile communication units can be performed in several ways. These include providing a mobile communication unit with positioning equipment, such as GPS, or using network and mobile measurement data for nearby cells.

However, even if a user's terminal device has a GPS receiver built in, these devices are frequently disabled by users to save battery life. They are not included at all on many devices, e.g. low-cost handsets, data 'dongles' for laptops and machine-to-machine data communication terminals. The use of GPS data alone is therefore not sufficient to build an accurate picture of network service levels.

Some cellular systems are mandated to provide user location information when an emergency ('911') call is made. Again these calls are not sufficiently frequent to build up a good picture of the quality of service experienced throughout a network at all times of the day and night, and in all seasons of the year. In addition, the network equipment architecture required in these 'E911 Geolocation' systems is complex, since every base-station in the network needs to be fitted with an additional piece of electronics in order to locate the user to a suitable (mandated) degree of accuracy, which is typically 100 m. To use this type of architecture for service quality assessments throughout a network would be prohibitively expensive.

The network statistics referred to above, which only provide the average data rate or the average number of dropped calls in a given sector, are insufficient for some tasks faced by network operators. For example, if a particular mobile user complains that he is often subject to poor service, the data that is available may not help. Likewise, some individual faults in the network, such as wrongly directed antennae, may not be revealed by the 'average' data.

To try and improve the information available on service levels, some operators have attempted to compile more comprehensive data for a limited time on what exactly is happening in one sector or one cell of a network. There are two reasons why this is rarely done, as follows:
(i) A vast amount of data is created, even for a short time period, such as a few hours. Storing this data in a retrievable form is very expensive.
(ii) Once data concerning calls made in a sector or cell of a network has been recorded for a period of a few hours, it then requires specialist post-processing. Without this, it is very difficult to access individual records within an acceptable time. After post-processing, any information that can be gleaned about a user, or part of the network, is then often only available several hours after the end of the data capture. This may be several days after a user has made a complaint. Even such information is only of limited value.

FIG. 1 shows one prior art approach, in the form of a flow chart.

The approach shown in FIG. 1 is usual in the 'batch processing' technique used by known systems. Method 100 of FIG. 1 gathers all of the information for a time period after a problem arose in a network sector. Step 110 involves deciding where to place a probe. Step 120 involves operating the probe for long enough to obtain meaningful data. Step 130 involves specialist off-line processing of the information. Step 140 involves a user deciding what can be understood, from the processed data. Step 140 may take many different forms, depending on the reason why the probe was added to the network.

With the process of FIG. 1, the data is essentially obtained manually by the operator of the network, and processed off-line. This typically results in a delay of many hours, between the event of interest taking place and the resulting diagnostic information being available.

The fact that the process of FIG. 1 is 'retroactive' may also be a problem. It will only assist in identifying a fault:
(i) If it is a network fault that is still detectable, rather than one that only occurs intermittently.
(ii) If the user happens to be active during the few hours when the data is captured, in cases where the fault is due to a faulty handset.

In summary, the prior art relies on average statistics for much quality of service analysis. Where data is captured, it is often only of value if a fault happens to re-occur during the period of capture. Skilled analysis is required to process the captured data.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a geolocation data acquisition system for communication session data from a mobile radio communications network, and a method of geolocation data acquisition.

The geolocation data acquisition system and method employ network probes to capture communication session data continuously, from a network of call processors of a mobile radio communications network. The network probes thereby capture communication session data for substantially all calls in each geographical region of the mobile radio communications network. The invention may use one or both of two kinds of network probe.

The network probes generally act as a data extraction module. One general type of probe can be located at the level of either the call processors or the base stations of the mobile radio communications network. The call processors may, for example, be 'Radio Network Controllers' of a 3G network. In this case, probes can either be arranged to tap into data at the location of the Radio Network Controller itself, or can be integrated with base stations of the mobile radio communications network. The second type of probe used as a data extraction module comprises a module of the Operation Support System of the mobile radio communications network.

Either type of probe that provides the function of the data extraction module will continually capture communication session data from each call processor. That data is then supplied to a series of storage areas. Each storage area is associated with a specific set of one or more call processors, and is adapted to store a record of the communication session data for each call made within the coverage area of the set of call processors.

The records stored in each storage area comprise the data available for all communication sessions in the geographical region associated with the corresponding set of call processors. The availability of data for each call means that a comprehensive database exists, from which geolocation data for each call can be derived.

The invention may capture all required data, at all times, and capture the data as it arises in the communications network. The real data from the network may therefore already be available for an event, when that event is reported. Here the 'event' may be a fault in the network infrastructure or a failing mobile communication. Furthermore, the data may show faults in the network that have yet to be reported, and these can then be pre-empted. The data can be searched to understand the cause of the original fault or problem, with no need to wait for it to recur. This may result in superior fault tracing performance and quality of service statistics, compared to those available from prior art systems.

Figure 2:
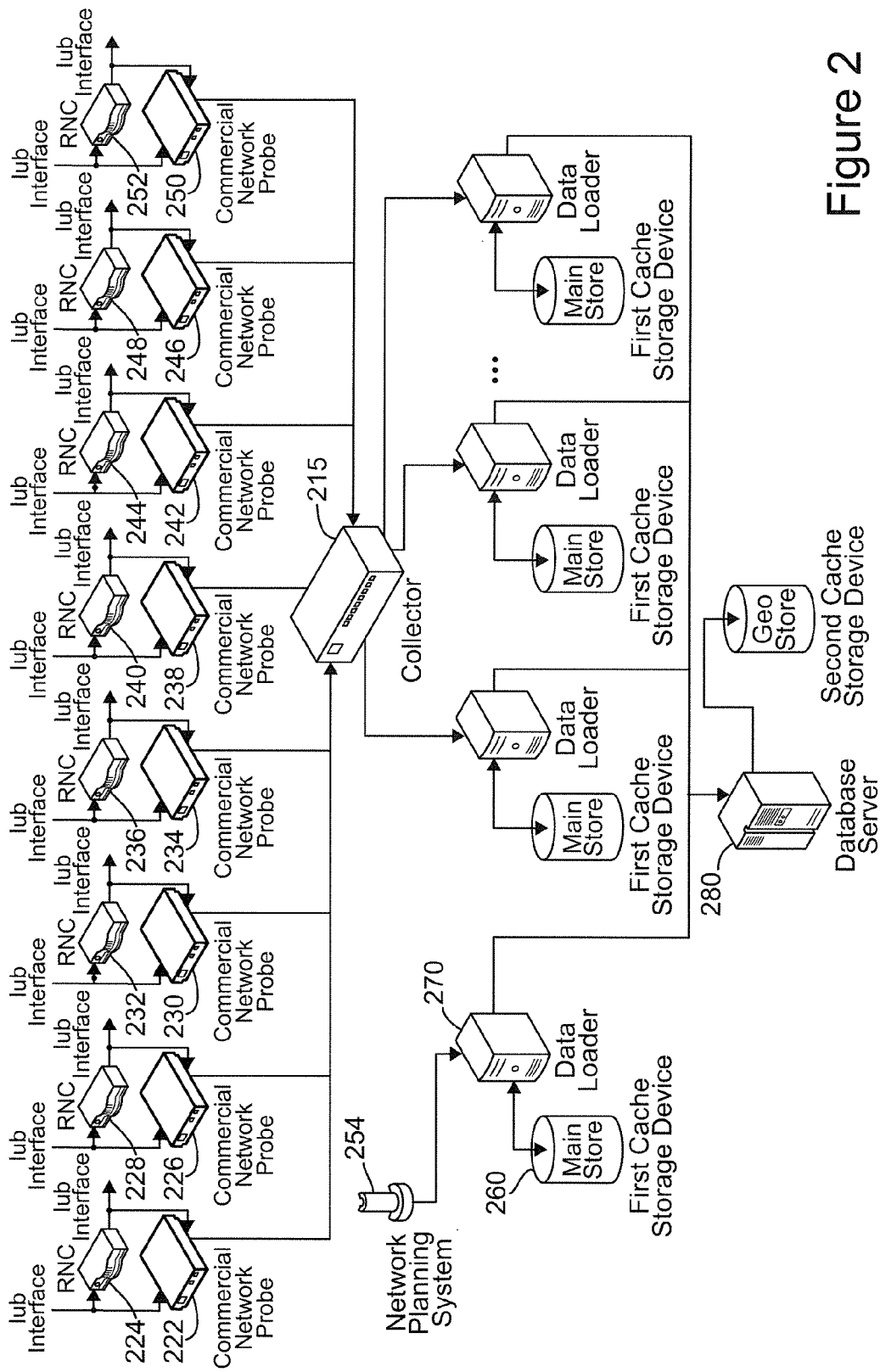
FIG. 2 is a schematic diagram of an apparatus in accordance with the invention.

FIG. 2 shows a geolocation data acquisition system for communication session data from a mobile radio communications network, The mobile radio communications network comprises a network of call processors such as elements 224, 228 and 232. In all, eight call processors 224, 228, 232, 236, 240, 244, 248, and 252 are shown the top row of FIG. 2. Each call processor supports mobile communication units in an associated geographical region of the coverage area of the mobile radio communications network.

Each call processor 224, 228 and 232 may comprise a radio network controller, which handles call data for a group of base stations. However, other designs of mobile radio communications networks will have call processors that may not be RNCs. In a typical large radio communications network, there are several hundred base stations. These base stations would typically be supported by several call processors. The base stations in a large mobile radio communications network may generate more than 100 gigabytes of call session data in a 24 hour period.

A data extraction module is linked permanently to each call processor, and is operable to extract communication session data continuously from each call processor. This arrangement means that, other than during maintenance periods, the data extraction module will always access the data on call sessions that is flowing to or from the call processor. This differs substantially from those prior art arrangements where the call session data from one sector or cell site of the mobile radio communications network is monitored for a period of perhaps a few hours.

In the embodiment of FIG. 2, the data extraction module takes the form of a network probe 222, 226, 230.

In embodiments of the invention where the data extraction module takes the form of a network probe, there are at least two possible configurations of probe, as follows:
(i) The probes may be connected to the Iub interface of the mobile radio communications network. Probes in this configuration essentially act analogously to test equipment. They are not integrated into the mobile radio communications network, i.e. the network is not adapted or changed to accommodate them. These probes essentially tap into a stream of existing call session data that is flowing from or to the call processors 224, 228 and 232. The probes have been termed 'Commercial Network Probes' in FIG. 2, because such designs of probe are commercially available. However, this design of probe is for use in the prior art as a temporary data monitor, typically for just one call processor, to try and trace a fault that is believed to be present at that call processor.

Figure 3:
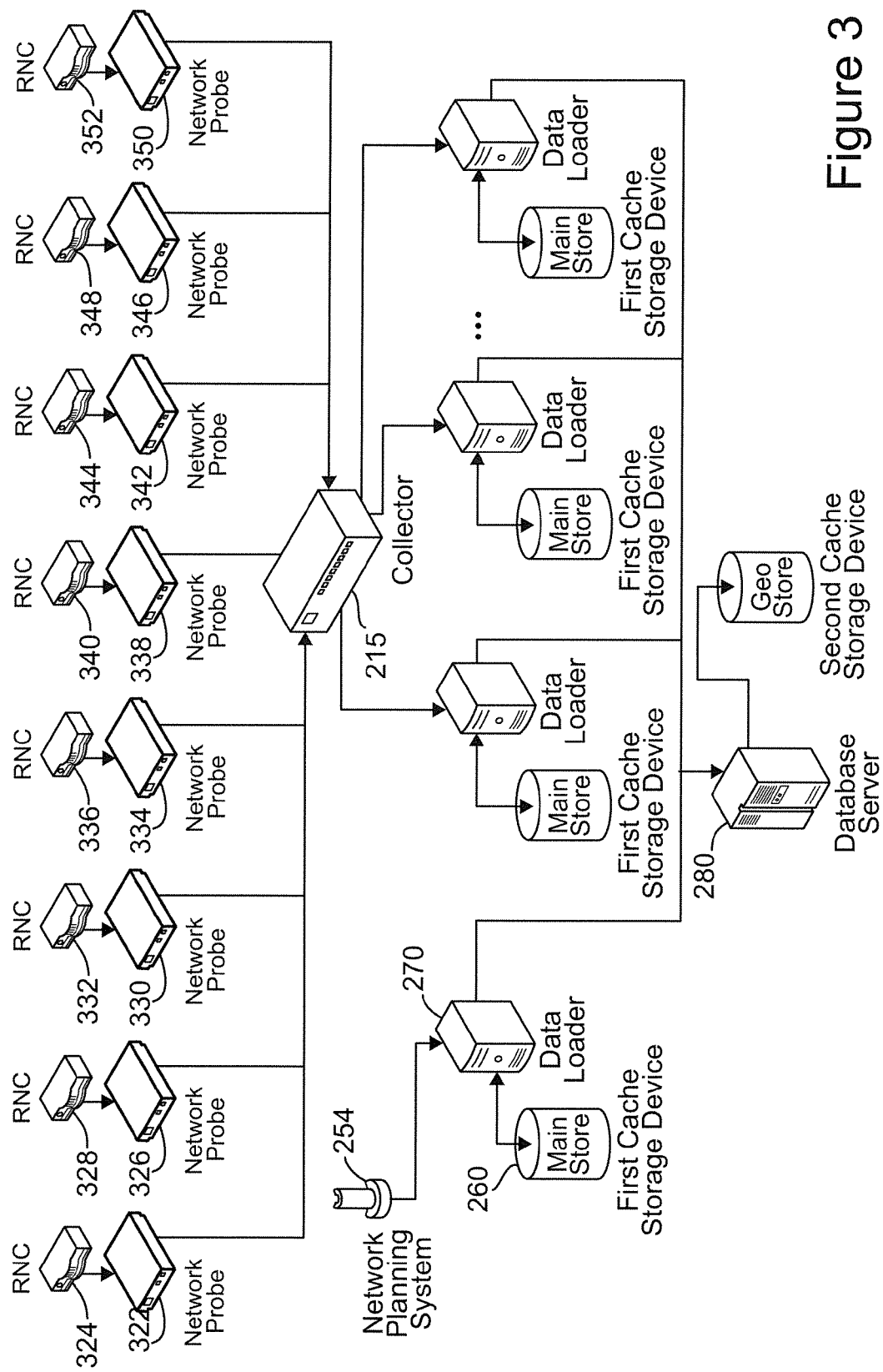
FIG. 3 is a schematic diagram, illustrating an alternative embodiment of an apparatus in accordance with the invention.

(ii) The second possibility is to install a probe in each base station of the mobile radio communications network. Each call processor typically handles call session data from many base stations. So installing a probe in each base station requires more probes. FIG. 3, which is explained in more detail later, shows such probes symbolically as elements 322, 326 and 330. However, there would be multiple probes for each call processor, rather than the illustrative single probe 322, 326 and 330 per processor shown on FIG. 3, since there may be one probe per base station.

The probes 222, 226, 230 of FIG. 2 supply data to collector 215. Collector 215 may be a server. Collector 215 forwards data to the subsequent processing circuitry. This circuitry may comprise multiple storage areas 260, each supplied with data via a dataloader 270.

The invention may be implemented with a mix of the two types of probe 222 and 322 explained under (i) and (ii) above. So data may be gathered from some parts of the mobile radio communications network using probes 222 arranged at the location of the call processors, as shown in FIG. 2. Other parts of the same mobile radio communications network may have probes 322 installed directly in base stations.

In a further embodiment, the data extraction module takes the form of a module within the Operational Support System of the mobile radio communications network itself. Thus the data for each call processor can be harvested directly from existing signalling within the Operational Support System. The advantage of this approach is that it does not require the dedicated network probes 222 and 322 of FIGS. 2 and 3.

The arrangement of the invention, as shown for example in FIG. 2, contrasts with the prior art arrangements described in the background section in that:

(i) The continuous extraction of communication session data means that all session data passing through a call processor 224, 228, 232, 324, 328, 332 will be captured, over a period of weeks, months or years. The system of FIG. 2 may be set up to run indefinitely. The prior art arrangements saw the data gathering phase as an activity for perhaps a few hours. The continuous data extraction of the invention does not require operator intervention, to decide where in the network to install a probe, and for how long. The data extraction module/probe of the invention taps into the mobile radio communications network, and serves as an automatic feed of information from the network.

(ii) Each of the call processors 224, 228, 232 has a data extraction module 222, 226, 230 associated with it. This means that all the geographical regions of the network are monitored simultaneously, and communication session data is extracted from all the call processors 224, 228, 232 of the network.

With the invention, therefore, each data extraction module 222, 226, 230 is operable to access communication session data for calls made within the coverage area of the call processors 224, 228, 232 to which the data extraction module 222, 226, 230 is linked. The communication session data for the calls is then stored in a storage area 260 that is associated with the particular data extraction module 222, 226, 230 and with a set of the call processors 224, 228, 232 from which the data originated. The storage area 260 for a data extraction module 222, 226, 230 is adapted to store a record of the communication session data for each call made within the coverage area of the set of the call processors 224, 228, 232 to which the data extraction module 222, 226, 230 and storage area 260 are linked. The set of call processors associated with any individual storage area 260 may comprise just one call processor 224, or may comprise more. Typically, ten call processors may be associated with one individual storage area 260. The members of the set may also vary over time.

As a result of the structure shown in FIG. 2, the records stored in each storage area 260 comprise the data available for all communication sessions in a corresponding coverage area of the associated set of call processors 224, 228, 232. The following three detailed examples illustrate how this may be achieved:

a) The first storage area 260 may be arranged to be a fast, local store. The records are first saved from the data extraction module to the fast, local store. Here 'local' means that the storage area 260 is associated with the data extraction module 222, 226, 230, e.g. the network probe, and the call processor 224, 228, 232 from which it extracts communication session data. The records can be extracted from the fast store, processed, and then the original record passed to a slower, large store. The advantage of this approach is the speed of the processing. A disadvantage might be the necessary size of the slower, larger store.

b) The first storage area 260 may be arranged to be a fast, local store, to which the records are saved from the data extraction module 222, 226, 230. The records can be extracted from the fast store, processed, and then the original record can be deleted. The advantage of this is the processing speed. The disadvantage is the fact that the original record is not available subsequently, for example for any detailed study.

c) The first storage area 260 may be arranged to be a larger, local store, to which records are first copied from the data extraction module. The records can simply be extracted from the larger store, and processed. The advantage is that very little fast local disk space is required.

In embodiments of the invention using a network probe as the data extraction module 222, 226, 230, each network probe may capture communication session data flowing between the radio network controller and another element of the mobile radio communications network. The other element of the mobile radio communications network may be the Operational Support System of the mobile radio communications network. In this situation, the network probe will tap into all the communication session data flowing between the radio network controller and the operational support system, for calls occurring in the coverage area of the radio network controller. This requires only that the network probes harvest data which is already flowing within the mobile radio communications network.

In the alternative embodiment described above, at least one of the data extraction modules is formed by a module of the operational support system of the mobile radio communications network. The function of the module is to capture communication session data that reaches the operational support system, for calls occurring in the coverage area of a radio network controller of the radio communications network. Thus the module can extract call session data for calls processed by the radio network controller, as that data reaches the operational support system.

There is a wide variety of call session information that may be of use to the geolocation data acquisition system of the present invention. Once data has been obtained from each data extraction module 222, 226, 230, a subset of information may be assembled for each call record. Typically, the subset may comprise, for example:

(i) Call connection setup information and call closedown information;

(ii) Information concerning the radio links and/or the radio bearers involved in the call;

(iii) The type of call;
(iv) Timing data concerning the cell sites visible to a user terminal;
(v) Received signal strength and/or signal-to-noise ratio for the call.

However, many other items of data for the call may be selected instead of (i)-(v) above. Once data such as this subset of the communication session data has been assembled for each call, it may be processed to provide geolocation information for each call. This geolocation information may be available far more rapidly than with conventional arrangements, and be available for all calls, in all geographical regions of the mobile radio communications data.

The geolocation information for each call may be passed to a database server 280, and on to a subsequent geolocation data store. The geolocation data store is shown as the 'Geo store' adjacent to database server 280 in FIG. 2. The geolocation information for each call may be stored together with the subset of data, such as the information shown under (i)-(v) above. One geolocation data store may collect all the subsets of data and the geolocation data from all calls, as shown in FIG. 2.

When the data extraction module is a probe connected to a radio network controller, or is a module of the OSS, it may be able to extract messages covering all of the information listed in table 1 below:

TABLE 1

Messages extracted continuously by data extraction module

| Type of information | Example/comment |
|---|---|
| Call connection setup information | This may include:<br>(i) The fact that a new voice or data call has been set up; and<br>(ii) The time at which it was set up. |
| Call closedown information | This may include:<br>(i) The fact that a voice or data call has been closed down;<br>(ii) The time at which this happened; and<br>(iii) The reason why the call closed down, i.e. was it closed down intentionally by the user, or prematurely due to a problem in/with the network. |
| Identification of the radio links involved in the call | This provides information about the base-stations to which the call is connected. |
| Measured radio propagation delay | This is the propagation delay measured for signals passing from the base-station to the handset, or vice versa. |
| The radio bearer or bearers involved during the call | The radio bearer(s) may be, for example, 3G, HSPA, HSPA+ etc. More than one may be involved, for example during a video-conferencing call. |
| The type of call | Examples of call types are: voice, data, SMS, MMS etc |
| Measurement reports | Measurement reports may provide information on:<br>(i) Cell sites that are visible to the user's terminal<br>(ii) Timing values. These may be offsets from the user-terminal's master clock at which the base-station's signals are seen. These may be used to determine the terminal's geographic location. |
| RCSP | The RCSP is effectively the received signal strength and signal-to-noise ratio, in the form of Ec/No. |
| Subscriber information | This may comprise the IMSI and IMEI. However, the user's identity is not known, since it is not known by the network. |

Some or all of the communication session data in Table 1 is stored in its original, unprocessed format in the first storage areas 260 associated with the radio network controller from which it was extracted. A subset of the data stored in first storage areas 260 will pass to the geolocation data store.

The geolocation data acquisition system of the invention may comprise a processing unit, indicated as data loader 270 on FIG. 2. Data loader 270 may lie between the data extraction module and the first storage area 260 that receives communication session data from that data extraction module. The data loader 270 associated with a storage area 260 may:
(i) receive the communication session data from the data extraction module;
(ii) store the communication session data as a record for each call, in the storage area 260 associated with the data loader 270;
(iii) process the communication session data, to identify a subset of communication session data and geolocation information for each record of a communication session; and
(iv) send the subset of communication session data and geolocation information for each record to the geolocation storage area.

The data loader 270 may also derive quality of service information from each record of a communication session, and send the quality of service information to the geolocation storage area 250.

Finally, network planning system 254 is shown in FIG. 2. Network planning system 254 may provide information to a data loader 270. Network planning system 270 may contain information such as:
(i) The location of antennas that serve cells or base stations of wireless communications network; and
(ii) The pointing angle of the antennas.

Information from network planning system 254 may be collected and processed by a data loader 270. The information from the network planning system may more rapidly enable a decision to be made about whether to change the configuration of the mobile wireless communication system, in the light of the information collected by the network probes about events, such as faults in the operation of the mobile wireless communication system. Network planning system 254 may contribute to diagnosis of a fault, and action to correct the fault, more rapidly than otherwise would be possible. In some instances, a fault may be diagnosed before it has been either noticed or reported by users of a network. This contributes to system reliability, hence reducing the resources needed to deal with the consequences of faults that last for prolonged periods, in the network.

FIG. 3 shows an embodiment of the invention with network probes integrated into the hardware of the mobile radio communications network.

The network probes are shown as 322, 326, 330, 334, 338, 342, 346, and 350. The corresponding call processors 324, 328, 332, 336, 340, 344, 348, and 352 are radio network controllers of a mobile radio communications system. The collector 215, network planning system 254, data loaders 270, first storage areas 260, database server 280 and geolocation data store of FIG. 3 correspond to those elements on FIG. 2.

Network probes are shown as 322 to 350 are integrated into elements of the mobile radio communications system. As described earlier, they may comprise a network of probes, built into the base stations of the mobile radio communications system. However, they may be integrated into other parts of the mobile radio communications system. A difference over the probes shown in FIG. 2 is that in FIG. 2, the probes tap into the call processors, without further disturbance to the mobile radio communications system. With the probes of FIG. 3, more engineering effort may be required to install the probes permanently.

Figure 1:
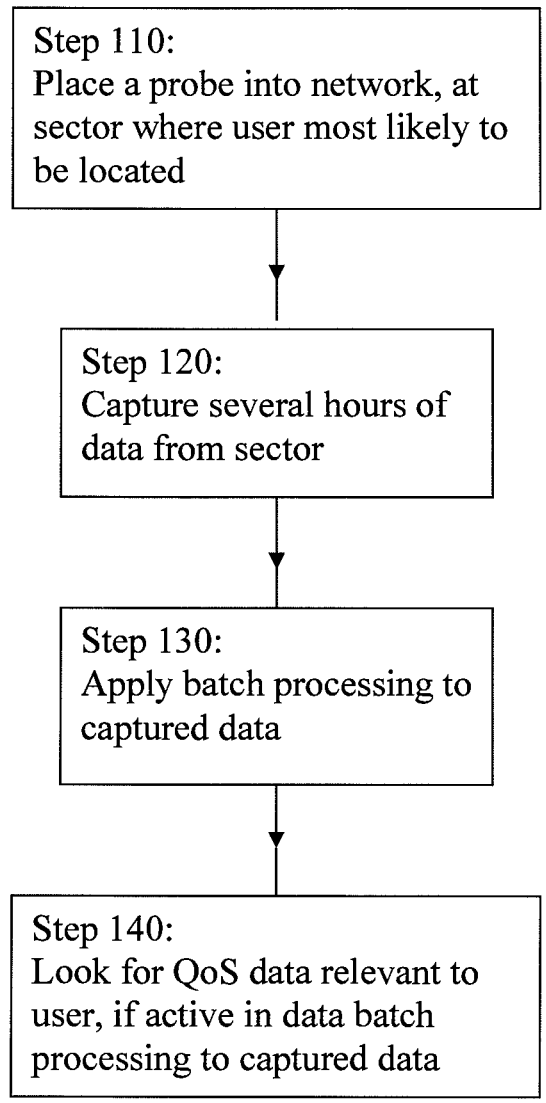
FIG. 1 is a flowchart, illustrating a prior art method.
Figure 4:
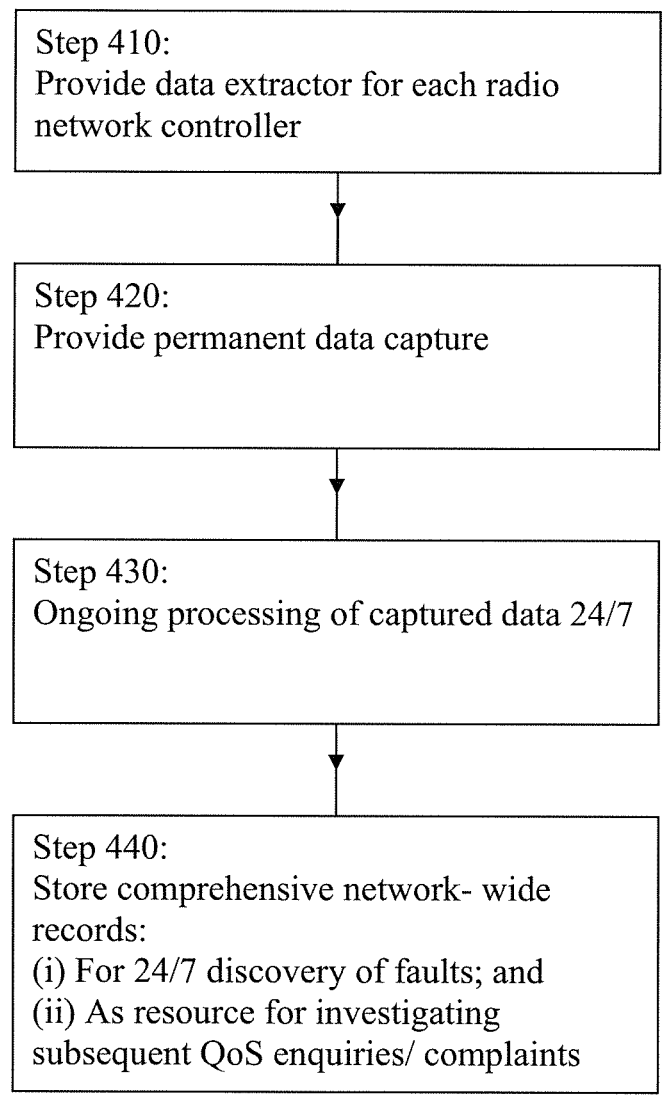
FIG. 4 is a schematic diagram, illustrating a generalised method in accordance with the invention.

FIG. 4 shows a general illustration of a method in accordance with the invention, to show how this differs from the approach shown in FIG. 1. The steps of FIG. 4 contrast very clearly with those of prior art FIG. 1. Step 410 shows that a data extractor, such as a network probe, is provided for each radio network controller. This is an action that is performed once, not occasionally when there has been a report of a fault in part of a network.

Step 420 shows that data capture is arranged to be ongoing, i.e. continuous. Step 430 shows that the data processing is also ongoing, rather than the batch processing of data as was the case with the prior art. Step 440 makes clear what has been achieved. The records held in storage areas 260 are comprehensive. The storage of comprehensive data from the network probes provides a resource for later investigation of faults, using data that was captured as the faults first occurred, rather than retrospectively.

The method of FIG. 4 makes clear some of the advantages of the invention. The invention may wholly or partially overcome the problems associated with the prior art of:

(i) Physical storage space, since many hundreds of gigabytes of data may be produced in one communications network, each day.

(ii) How to access that data.

(iii) Which bits of that data to access.

Figure 5:
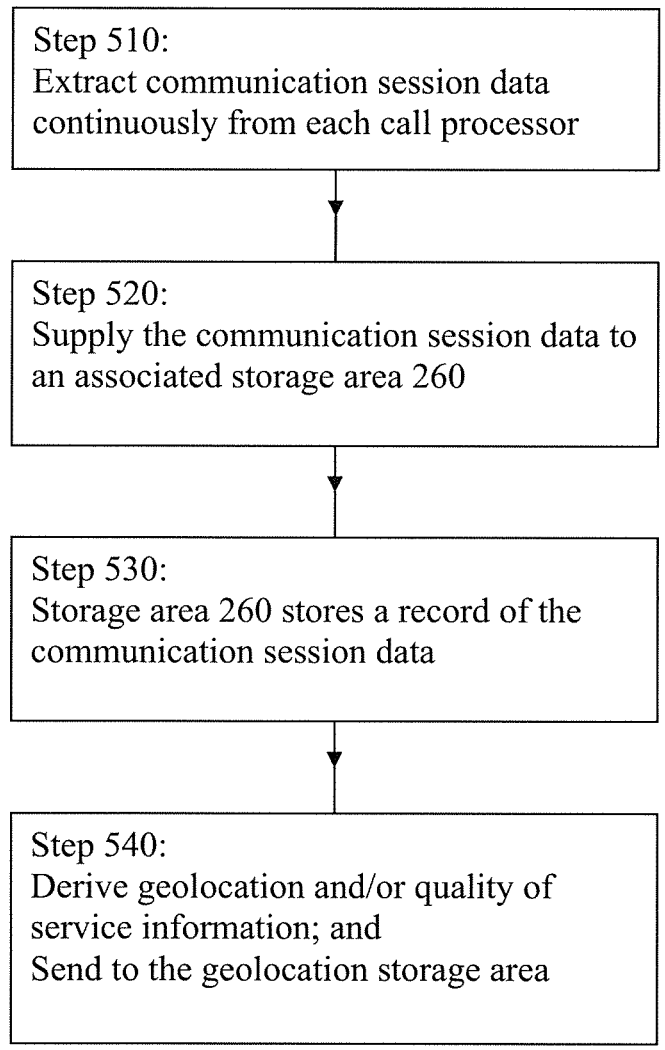
FIG. 5 illustrates a simplified flowchart of a specific method implementing the invention.

FIG. 5 provides a specific embodiment of the method 500 of the invention for geolocation data acquisition, for communication session data from a mobile radio communications network. Although the method is shown as steps, some of the steps are simultaneous. For example, steps 510-530, once started, continue indefinitely.

In step 510, a data extraction module extracts communication session data continuously from each call processor. In step 520, the data extraction module supplies the communication session data to a storage area 260 associated with the call processor 224 and the data extraction module.

In step 530, the storage area stores a record of the communication session data for each call made within the coverage area of the call processor 224. As a result of steps 510-530, the records stored in each storage area 260 comprise the data available for all communication sessions in the geographical region associated with the corresponding set of call processors.

In optional step 540, the data loader 270 derives geolocation and/or quality of service information from each record of a communication session, and sends these to the geolocation storage area.

A computer-readable storage device may be provided, to perform the method of the invention. The computer-readable storage device has executable program code stored therein, for programming signal processing logic to perform the method of the invention. The computer-readable storage device may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

The inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A geolocation data acquisition system for communication session data from a mobile radio communications network, the mobile radio communications network comprising a network of call processors, each call processor supporting mobile communication units in an associated geographical region of the coverage area of the mobile radio communications network, comprising:

a data extraction module, operable to extract communication session data continuously from each call processor;

the data extraction module being:

(i) operable to access communication session data for calls made within the coverage area of each call processor linked to the data extraction module; and (ii) further linked to a storage area associated with a set of the call processors and the data extraction module, the storage area adapted to store a record of the communication session data for each call made within the coverage area of the set of call processors;

whereby the records stored in each storage area comprise the data available for all communication sessions in the geographical region associated with the corresponding set of call processors;

wherein the geolocation data acquisition system further comprising:

a data loader associated with each storage area, the data loader operable to: process the communication session data stored within the respective storage area to identify a subset of communication session data and to provide geolocation information for each communication session record, the geolocation information being derived from measurement data for cells contained within the communication session data; and send the subset of communication session data and geolocation information for each communication session record to a geolocation storage area.

2. A geolocation data acquisition system in accordance with claim 1, further comprising:

at least two data extraction modules, at least one of the data extraction modules being a network probe;

at least one of the network probe being connected to a radio network controller of the mobile radio communications network, the radio network controller being the call processor for an associated coverage area of the mobile radio communications network;

whereby the network probe captures communication session data flowing between the radio network controller and another element of the mobile radio communications network.

3. A geolocation data acquisition system in accordance with claim 2, wherein:

the network probe is an external probe, arranged to tap into a flow of communication session data at the location of the radio network controller, without being integrated into the mobile radio communications network.

4. A geolocation data acquisition system in accordance with claim 2, wherein:

the network probe is integrated into a base station of the mobile radio communications network.

5. A geolocation data acquisition system in accordance with claim 2, wherein:

the network probe captures communication session data flowing between the radio network controller and the operational support system of the mobile radio communications network.

6. A geolocation data acquisition system in accordance with claim 1, wherein:

at least one of the data extraction modules is a module of the operational support system of the mobile radio communications network;

the call processors are radio network controllers of the radio communications network; and the at least one module is operable to capture communication session data reaching the operational support system for calls occurring in the coverage area of the radio network controllers.

7. A geolocation data acquisition system in accordance with claim 1, further comprising a data loader associated with each storage area, the data loader operable to:

(i) receive the communication session data from the data extraction module;

(ii) store the communication session data as a record for each call, in the storage area associated with the data loader;

(iii) process the communication session data, to identify a subset of communication session data and geolocation information for each record of a communication session; and (iv) send the subset of communication session data and geolocation information for each record to a geolocation storage area.

8. A geolocation data acquisition system in accordance with claim 7, wherein the subset of communication session data comprises one or more of:

(i) call connection setup information and call closedown information;

(ii) information concerning the radio links and/or the radio bearers involved in the call;

(iii) the type of call;

(iv) timing data concerning the cell sites visible to a user terminal;

(v) received signal strength and/or signal-to-noise ratio for the call.

9. A geolocation data acquisition system in accordance with claim 7, wherein:

the data loader is operable to derive quality of service information from each record of a communication session, and to send the quality of service information to the geolocation storage area.

10. A method of geolocation data acquisition for communication session data from a mobile radio communications network, the mobile radio communications network comprising a network of call processors, each call processor supporting mobile communication units in an associated geographical region of the coverage area of the mobile radio communications network, comprising:

a data extraction module extracting communication session data continuously from each call processor;

whereby:

(i) the data extraction module accesses communication session data for calls made within a coverage area of a call processor linked to the data extraction module; and (ii) the data extraction module supplies the communication session data to a storage area associated with a set of the call processors and the data extraction module, the storage area storing a record of the communication session data for each call made within the coverage area of the set of call processors;

whereby the records stored in each storage area comprise the data available for all communication sessions in the geographical region associated with the corresponding set of call processors;

whereby a data loader associated with each storage area:

processes the communication session data stored within the respective storage area to identify a subset of communication session data and to provide geolocation information for each communication session record, the geolocation information being derived from measurement data for visible cells contained within the communication session data; and sends the subset of communication session data and geolocation information for each communication session record to a geolocation storage area.

11. A method in accordance with claim 10, further comprising:

providing at least two data extraction modules, at least one of the data extraction modules being a network probe, at least one of the network probes being connected to a radio network controller of the mobile radio communications network, the radio network controller being the call processor for an associated coverage area of the mobile radio communications network; and the network probe capturing communication session data flowing between the radio network controller and another element of the mobile radio communications network.

12. A method in accordance with claim 11, further comprising:

the network probe capturing communication session data flowing between the radio network controller and the operational support system of the mobile radio communications network.

13. A method in accordance with claim 10, further comprising:

at least one of the data extraction modules being a module of the operational support system of the mobile radio communications network, and the call processor being a radio network controller of the radio communications network; and the at least one data extraction module capturing communication session data reaching the operational support system, for calls occurring in the coverage area of the radio network controller.

14. A method in accordance with claim 10, wherein a data loader associated with a storage area:

(i) receives the communication session data from the data extraction module;

(ii) stores the communication session data as a record for each call, in the storage area associated with the data loader;

(iii) processes the communication session data, to identify a subset of communication session data and geolocation information for each record of a communication session; and (iv) sends the subset of communication session data and geolocation information for each record to a geolocation storage area.

15. A method in accordance with claim 14, wherein the data loader extracts the following communication session data:

(i) call connection setup information and call closedown information;

(ii) information concerning the radio links and/or the radio bearers involved in the call;

(iii) the type of call;

(iv) timing data concerning the cell sites visible to a user terminal;

(v) received signal strength and/or signal-to-noise ratio for the call.

16. A method in accordance with claim 14, wherein:

the data loader derives quality of service information from each record of a communication session; and sends the quality of service information to the geolocation storage area.

17. A computer-readable storage device having executable program code stored therein for programming signal processing logic to perform a method in accordance with claim 10.

18. The computer-readable storage device of claim 17, wherein the computer-readable storage device comprises at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Hash memory.

* * * * *

UNITED STATES PATENT AND TRADEMARK OFFICE
CERTIFICATE OF CORRECTION

| | | |
|---|---|---|
| PATENT NO. | : 8,805,321 B2 | Page 1 of 1 |
| APPLICATION NO. | : 13/293558 | |
| DATED | : August 12, 2014 | |
| INVENTOR(S) | : Kenington et al. | |

It is certified that error appears in the above-identified patent and that said Letters Patent is hereby corrected as shown below:

In the Claims

Claim 18 - Col. 14, line 32, "Hash" should read -- flash --

Signed and Sealed this
Twenty-eighth Day of July, 2015

Michelle K. Lee
*Director of the United States Patent and Trademark Office*